Oct. 1, 1929.  E. C. BIEWEND ET AL  1,729,863
SCREW MACHINE STOP
Filed April 9, 1926
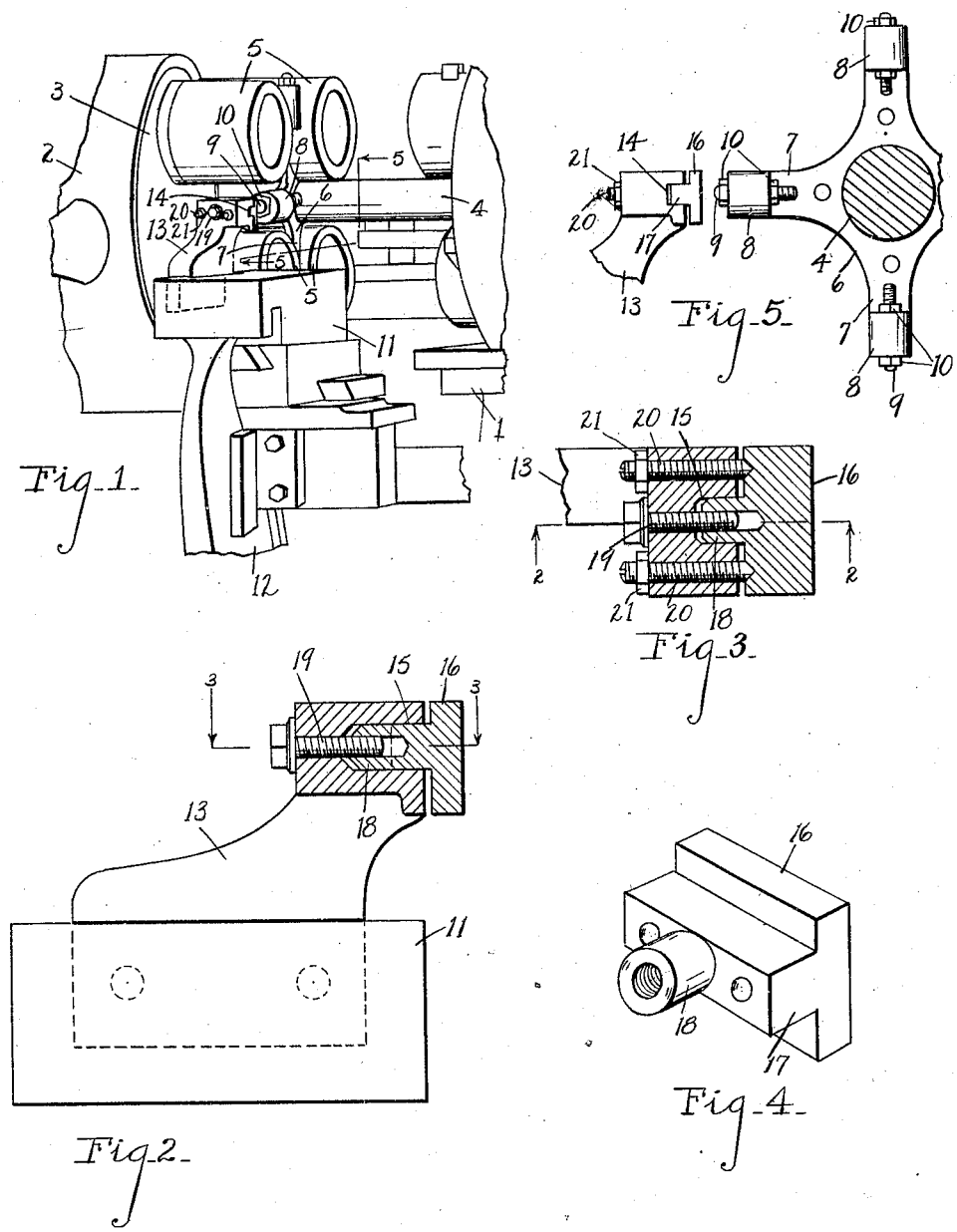
INVENTOR
Erik C. Biewend
Walter R. Konkle
BY
Chappell & Earl
ATTORNEYS Patented Oct. 1, 1929

1,729,863

UNITED STATES PATENT OFFICE

ERIK C. BIEWEND AND WALTER R. KONKLE, OF JACKSON, MICHIGAN

SCREW-MACHINE STOP

Application filed April 9, 1926. Serial No. 100,868.

The main object of this invention is to provide an improved stop means for multiple spindle lathes whereby a single adjustment is effective for the several spindles.

A further object is to provide a stop means of the character described which is readily adaptable to lathes of well-known types.

Objects pertaining to details and economies of our invention will definitely appear from the detailed description to follow. The invention is clearly defined and pointed out in the claims.

A structure embodying the features of the invention is clearly illustrated in the accompanying drawing forming a part of this application, in which:

Fig. 1 is a fragmentary perspective view of parts of a lathe, only such parts being shown as are deemed necessary to illustrate an adaptation of our improvements.

Fig. 2 is a detail view of portions of the tool carriage with our improved stop means mounted thereon, the same being sectioned on line 2—2 of Fig. 3.

Fig. 3 is a fragmentary view partially in section on a line corresponding to line 3—3 of Fig. 2.

Fig. 4 is a rear perspective view of the carriage feed stop plate.

Fig. 5 is a fragmentary view partially in section on a line corresponding to line 5—5 of Fig. 1.

Referring to the drawing, 1 represents parts of the frame of the lathe and 2 the head thereof. The spindle turret 3 is rotatively mounted in this head and has a central shaft 4. The spindles are conventionally shown at 5. A spider-like stop carrying member 6 is bolted to the turret and has radial arms 7 terminating in enlargements 8 in which the screw stop members 9 are threaded. These stop members have lock nuts 10 at each end of the enlargement whereby the stops are securely held in their adjusted positions.

The tool carriage is provided with a cross feed slide 11. The actuating means is indicated at 12, this being a cam actuated arm and the cam not being illustrated.

On the side of this cross feed slide we mount a bracket 13 having a groove 14 in the face thereof and a central bore-like socket 15. The stop plate 16 is provided with a rib 17 on its rear side fitting into this groove, the rib having a central boss or stem 18 fitting into the socket 15. This stem 18 is internally threaded to receive the adjusting screw 19 whereby the stop block may be adjusted.

Set-screws 20 are disposed through the bracket at either side of the adjusting screw 19 and these screws are provided with lock nuts 21. The screws securely hold the stop plate in its adjusted positions and enable the accurate alining of the face thereof. As the spindle turret is rotated with a step by step movement this stop successively coacts with the stops on the spindle turret.

It has heretofore been the practice to separately adjust the stops on the spindle turret to coact with a suitable feed stop but this requires skill and a considerable amount of time. By means of our improvements we are able to secure the result by the adjustment of a single stop member.

We have illustrated and described our improvements in an embodiment which we have found very practical in use. We have not attempted to illustrate or describe various embodiments or adaptations as we believe that this disclosure will enable those skilled in the art to embody or adapt our improvements as may be desired.

Having thus described our invention what we claim as new and desire to secure by Letters Patent is:

1. In a structure of the class described, the combination with a spindle turret provided with a plurality of feed stops operatively associated with the several spindles thereof, a tool carriage provided with a feed means, a bracket on said tool carriage provided with an inwardly facing slot on its inner side with a central bore-like socket, a stop plate having a rib on its rear side engaging said slot and a central internally threaded stem disposed in said socket, an adjusting screw disposed through said bracket and threaded into said stem, and set screws disposed through said bracket at each side of said adjusting screw to engage said stop plate whereby said stop plate is supported to successively coact with said several stops on said spindle turret.

2. In a structure of the class described, the combination with a spindle turret provided with a plurality of feed stops operatively associated with the several spindles thereof, a tool carriage provided with a feed means, a bracket on said tool carriage provided with an inwardly facing slot on its inner side, a stop plate having a rib on its rear side engaging said slot, and means for adjusting said stop plate comprising an adjusting screw.

In witness whereof we have hereunto set our hands.

ERIK C. BIEWEND.
WALTER R. KONKLE.